United States Patent
Tsai et al.

(10) Patent No.: US 6,383,629 B1
(45) Date of Patent: May 7, 2002

(54) OPTICAL ELEMENT HAVING A WATER REPELLANT COATING CONSTRUCTED FROM A COMPOSITE MATERIAL OF $CAF_2$ AND $TIO_2$

(75) Inventors: Rung-Ywan Tsai, Taoyuan Hsien; Lang-Chin Lin, Hsinchu; Mu-Yi Hua, Miaoli Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/776,958

(22) Filed: Feb. 5, 2001

(30) Foreign Application Priority Data

Aug. 15, 2000 (TW) .......................................... 089116427

(51) Int. Cl.$^7$ ............................................... B32B 17/06
(52) U.S. Cl. ........................ 428/336; 359/582; 359/586
(58) Field of Search ................... 359/582, 585, 359/586; 428/336

(56) References Cited

U.S. PATENT DOCUMENTS

| | | | |
|---|---|---|---|
| 3,895,155 A | * 7/1975 | Shukuri et al. | 351/166 |
| 4,410,563 A | 10/1983 | Richter | |
| 4,450,201 A | * 5/1984 | Brill et al. | 428/336 |
| 4,869,922 A | 9/1989 | D'Agostino | |
| 5,208,101 A | * 5/1993 | Boulos et al. | 359/580 |
| 5,688,608 A | * 11/1997 | Tsai et al. | 359/359 |
| 5,808,715 A | * 9/1998 | Tsai et al. | 349/122 |
| 6,066,401 A | * 5/2000 | Stilburn | 359/359 |

OTHER PUBLICATIONS

"Optical Transmission of Mylar and Teflon Films", By Zoltan Seres Et Al Optical Engineering/Sep. 1994/ vol. 33 No. 9/ pp. 3031–3033.

"Combination Moisture Resistant and Antireflection Plasma Polymerized Thin Films For Optical Coatings" By Jjohn R. Hollahan Et Al. Applied Optics / vol. 13, No. 8 / Aug. 1974 / p. 1844–1849.

* cited by examiner

*Primary Examiner*—Deborah Jones
*Assistant Examiner*—Gwendolyn Blackwell-Rudasill
(74) *Attorney, Agent, or Firm*—J.C. Patents

(57) ABSTRACT

An optical element having a water repellant composite layer composed of $CaF_2$ and $TiO_2$. The optical element includes a substrate and a composite layer having a chemical formula $(100-X)CaF_2—(X)TiO_2$ formed over the substrate. The X in the chemical formula represents the molar percentage of $TiO_2$ in the composite layer. Through the addition of TiO2 into a CaF2 layer to form the composite layer, surface roughness, adhesion strength and hardness of the layer in the optical element is improved without compromising water resistant capacity. For a composite layer having a percentage composition of $TiO_2$ between 2% to 100%, contact angle of water droplets is always greater than 100° comparable with Teflon. The refractive index varies according to the composition, but in general, the refractive index falls between 1.23 (2%$TiO_2$) to 2.3 (pure $TiO_2$) for incoming light with a wavelength of 600 nm. Aside from having a good water repellant capacity, the composite layer can also be used as an anti-reflection layer or a layer with special optical properties in an optoelectronic/optical element.

16 Claims, 5 Drawing Sheets

OPTICAL ELEMENT HAVING A WATER REPELLANT COATING CONSTRUCTED FROM A COMPOSITE MATERIAL OF CAF$_2$ AND TIO$_2$

CROSS-REFERENCE TO RELATED APPLICATION

This application claims the priority benefit of Taiwan application serial no. 89116427, filed Aug. 15, 2000.

BACKGROUND OF THE INVENTION

1. Field of Invention

The present invention relates to an optically coated element. More particularly, the present invention relates to an optical element having a water repellant coating constructed from a composite material of CaF$_2$ and TiO$_2$.

2. Description of Related Art

Most optical-electrical/optical coated elements have a plurality of organic or inorganic coatings on an organic (for example, acrylic resin, epoxy resin, polymer resin or polycarbonate resin) or inorganic (for example, ceramic, glass or metal) substrate to attain a specified optoelectronic/optical property. In some situations, the optically coated element needs to be water repellant with suitable hardness and environmental stability aside from the specified optoelectronic/optical property. To be water repellant, the optical element is usually coated with a Teflon material such as polytetrafluoroethylene, PTFE, [—CF$_2$—CF$_2$]$_n$ or polychlorotrifluoroethylene PCTFE, [—CF$_2$—CFCl—]$_n$ (refer to U.S. Pat. No. 4,869,922 by R D'Agositno et al, titled "Method of Coating with Polyfluorocarbons", U.S. Pat. No. 4,410,563 by H. P. Richter and E. J. Dibble, titled "Repellant Coatings for Optical Surface', and an article written by J. R. Hollahan et. al, titled "Combination Moisture Resistant and Antireflection Plasma Polymerized thin Films for Optical Coatings" in Applied Opt. 13, 1844–1849 (1974)). When a drop of water is dropped onto a polytetrafluoroethylene or polychlorotrifluoroethylene coated surface, the water droplet forms a high contact angle of 109°. By comparison, the same drop of water on a cleaned glass surface, magnesium fluoride (MgF$_2$) and indium-tin oxide (ITO), the contact angles are 15°, 28.5° and 37.2° respectively. A Teflon coating has a low refractive index (n=1.46, λ=500 nm) besides water repellant (refer to the article by Z. Seres et al, titled "Optical Transmission of Mylar and Teflon Films", in Opt. Eng. 33, 3031 . 3032 (1994)). Hence, a Teflon coating is often formed on an optical element to serve as a single anti-reflection layer (refer to the article by J. R. Hollahan et al, titled "Combination Moisture Resistant and Antireflection Plasma Polymerized Thin Films for Optical Coatings, in Applied Opt. 13, 1844–1849 (1974)). However, because Teflon material will absorb light in the upper visible (that is, lower than 500 nm), the ultraviolet (refer to the article by Z. Seres et. al, titled "Optical Transmission of Mylar and Teflon Films", in Opt. Eng. 33, 3031–3032 (1994)) and in the infrared region between 6 μm to 8 μm (refer to the article by J. R. Hollahan et al, titled "Combination Moisture Resistant and Antireflection Plasma Polymerized Thin Films for Optical Coatings, in Applied Opt. 13, 1844–1849 (1974)), the use of Teflon coating for transmitting light within these regions is restricted. On the other hand, most optical coatings on an optical element consist of a stack of alternately deposited high and low refractive index layers in order to obtain a specified optical function (refer to the article by H. A. Macleod, titled "Thin-Film Optical Filters" in 2$^{nd}$ ed., Adam Hilger Ltd., 1986). However, organic optical coating layer having a high refractive index is quite rare. Therefore, it is difficult to make a fully organic multilayer optical coating. Hence, the use of Teflon as an optical coating material is further limited. Consequently, finding a water repellant inorganic coating material that has suitable hardness and environmental stability to replace Teflon is an important preoccupation in the optical coating industry.

SUMMARY OF THE INVENTION

Accordingly, one object of the present invention is to provide an optical element having a water repellant composite layer composed of the materials CaF$_2$ and TiO$_2$. The optical element includes a substrate and a composite layer formed from a material having a chemical formula (100-X)CaF$_2$—(X)TiO$_2$. The composite layer is formed over the substrate, where X is the molar percentage of TiO$_2$.

A second object of the invention is to provide an optical element having a water repellant surface layer formed from a composite material including CaF$_2$ and TiO$_2$. The optical element includes a substrate, at least one optical coating and a composite surface layer having a chemical formula (100-X)CaF$_2$—(X)TiO$_2$. The optical coating and the composite surface layer are separately formed over the substrate. The X on the chemical formula (100-X)CaF$_2$—(X)TiO$_2$ of the composite surface layer represents the molar percentage of TiO$_2$. The optical coating can be a composite layer having a chemical formula of (100-Y)CaF$_2$—(Y)TiO$_2$, where Y on the chemical formula (100-Y)CaF$_2$—(Y)TiO$_2$ represents the molar percentage of TiO$_2$ and X≠Y.

The addition of some TiO$_2$ material into a CaF$_2$ film on the substrate to form the (100-X)CaF$_2$—(X)TiO$_2$ composite surface layer helps to increase surface smoothness, adhesion and hardness of the composite layer without causing any change to water repellant capability. The (100-X)CaF$_2$—(X)TiO$_2$ composite layer has superior water-resistant property. Ranging from a TiO$_2$ content X of 2% to 100%, the layer has a contact angle of over 100° for water drop comparable to that of Teflon. The refractive index of the composite layer varies according to its composition. In general, the refractive index is between 1.23 (for 2% TiO$_2$) and 2.3 (for pure TiO$_2$) for light having a wavelength of 600 nm. Beside having a superior water resistance property, the composite layer can be coated on the surface of an optoelectronic/optical element to increase transparency to light (or anti-reflection) or forming other optical film with specified requirement.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
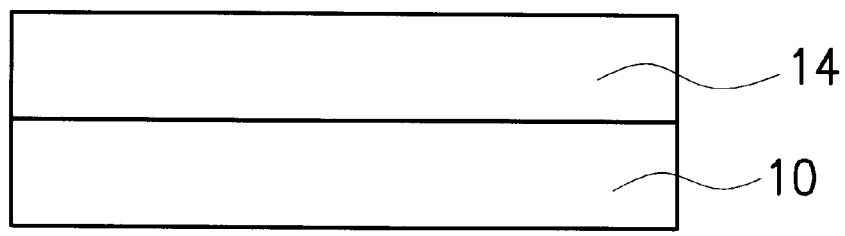
FIG. 1 is a sketch showing a water repellant optical element having a composite surface layer composing of CaF$_2$ and TiO$_2$ according to a first embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a sketch showing a water repellant optical element having a composite surface layer composing of $CaF_2$ and $TiO_2$ according to a first embodiment of this invention. As shown in FIG. 1, a composite layer 14 having a chemical formula $(100-X)CaF_2$—$(X)TiO_2$ is formed over a substrate 10 by performing a low temperature ion-assisted electron-gun evaporation process. In the chemical formula $(100-X)CaF_2$—$(X)TiO_2$, X represents the molar percentage of $TiO_2$.

The precursor materials for forming the composite layer 14 by evaporation include $CaF_2$ pellets and $Ti_2O_3$ tablets. To control the composition of the composite film, the rate of evaporation of $TiO_2$ is set to 0.2 nm/s and the rate of evaporation of $CaF_2$ is set to 0~2 nm/s. Before evaporation, the chamber is pumped down from atmosphere to a vacuum having a pressure smaller than $2\times10^{-5}$ Torrs. Argon (Ar) having purity greater than 99.99% is passed into the bottom of the ion source. The flow of argon is set to about 7 sccm (standard cubic centimeter per minute) by a mass flow meter. In addition, a mixture of argon (purity level greater than 99.99%) and oxygen ($O_2$)(purity level greater than 99.99%) is passed to the outlet of the ion source. The flow rate of argon and oxygen are 4.5 sccm and 10 sccm respectively. The working pressure is about $3\times10^{-4}$ Torrs. A voltage of 100V is applied to the source of the ion gun to produce a discharge current of 50 A. Hence, the entire ion energy is about 100 eV. Since bombardment by ions will not lead to obvious increase in temperature of the substrate, the source of heating comes from the evaporation source. Experimental testing has shown that the film coating operation will only lead to an overall increase in temperature smaller than 60° C. Therefore, the process is suitable for the coating a film on any heat sensitive organic or inorganic substrate and optoelectronic/optical element.

Pure $CaF_2$ film is often used as a low refractive index optical coating material. Transparency spectrum of a $CaF_2$ ranges from 0.2 to 10 μm. Hence, a $CaF_2$ film can serve as an anti-reflection coating for ultraviolet, visible and infrared light. For example, in U.S. Pat. No. 4,436,363 (by K. B. Steinbruegge et al., titled "Broadband Antireflection Coating for Infrared Transparent Materials'), pure $CaF_2$ is used as the outermost layer in a three-layered anti-reflection coating for infrared light. However, pure $CaF_2$ is rather soft (39~600 $Kgf/mm^2$) and has a high surface roughness. Adhesive strength (1~3N) between a $CaF_2$ film and a substrate is also weak (refer to S. Scaglione et al., "Modification of Mechanical Properties of E-Gun Evaporated $MgF_2$ and $CaF_2$ Thin Films under Ion beam Bombardment", in Applied Surface Science 43, 224–227 (1989)). Hence, a $CaF_2$ film has real application problems. In this invention, a low-temperature ion-assisted electron gun evaporation process is used to form a $(100-X)CaF_2$—$(X)TiO_2$ composite film. Through the addition of TiO2 material to a $CaF_2$ film, properties such as surface smoothness, adhesion strength and hardness of a $CaF_2$ film on a substrate all improve without compromising the water repellant characteristic. Table 1 below is a listing of surface smoothness, hardness, adhesion strength, refractive index and water-resistant of a pure $CaF_2$ film and a $(100-X)CaF_2$—$(X)TiO_2$ composite film for easy comparison. Surface smoothness is measured using a Form Talysurf Profilometer. Hardness is measured with an ultra-microscopic hardness meter. Adhesion strength is measured using a Sebastian Five-AZ module tester. Refractive index is obtained by measuring the transmission spectrum of a single layer film and calculated from the envelope of extreme values of the transmission curve. Water repellant is the contact angle made by a water droplet with a coating layer. The $(100-X)CaF_2$—$(X)TiO_2$ composite film has superior water repelling property. When the composition of $CaF_2$ in the $(100-X)CaF_2$—$(X)TiO_2$ composite film ranges from 0 to 100%, contact angle with water is always greater than 100° comparable with Teflon. The refractive index varies according to their composition. The refractive index varies from 1.2 (pure $CaF_2$) to 2.3 (pure $TiO_2$) for light having a wavelength of 600 nm. Although pure $CaF_2$ on a glass substrate has a surface roughness 14.4 nm, adhesion strength $19.1N/mm^2$ and hardness $231N/mm^2$, the addition of small amount of $TiO_2$ can change all these properties considerably for the better.

TABLE 1

| | Composition ($TiO_2$ mole percentage) | | | | | | | |
|---|---|---|---|---|---|---|---|---|
| Function | 0 | 0.5 | 2.7 | 6 | 10 | 16 | 32 | 45 | 100 |
| Surface Roughness (nm) | 14.4 | 13.8 | 9.6 | 8.3 | 5.2 | — | — | — | 4.7 |
| Hardness ($N/mm^2$) | 231 | — | — | — | 1846 | 3050 | 3350 | 3800 | 3300 |
| Adhesion Strength ($N/mm^2$) | 19.1 | 38.2 | 51.4 | 64.1 | 46.6 | 65 | 104 | 269 | 900 |
| Refractive Index (λ = 600 nm) | 1.20 | 1.22 | 1.24 | 1.33 | 1.36 | 1.60 | 1.75 | 1.86 | 2.30 |

TABLE 1-continued

| | Composition (TiO₂ mole percentage) | | | | | | | |
|---|---|---|---|---|---|---|---|---|
| Function | 0 | 0.5 | 2.7 | 6 | 10 | 16 | 32 | 45 | 100 |
| Water Repellant (angle in degrees) | 126~130 | 113~117 | 95~97 | 98~127 | 125~127 | — | — | — | 90~104 |

Figure 2:
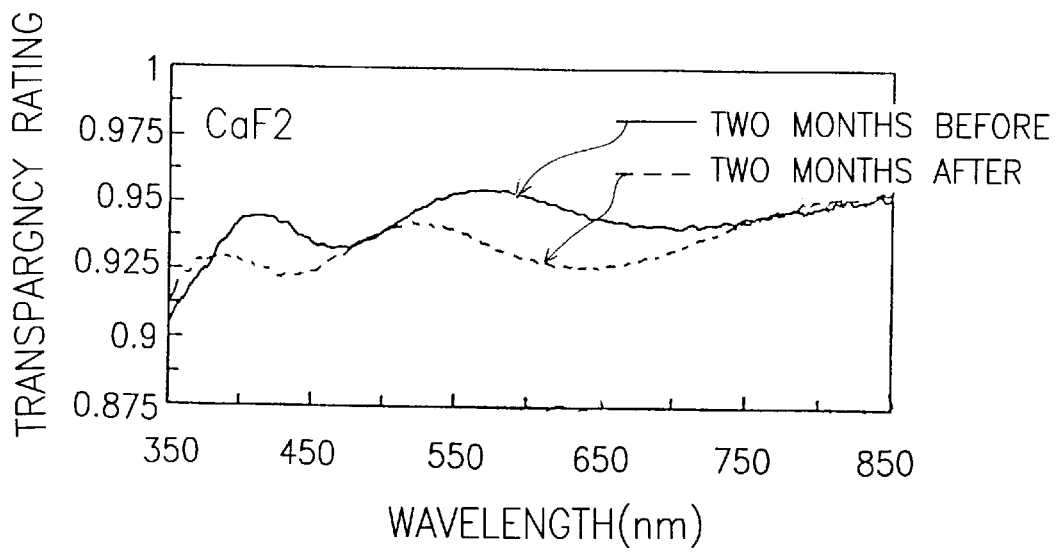
FIG. 2 includes two graphs, one showing the change in transmission of a pure CaF$_2$ layer and another showing the change in transmission of a 90CaF$_2$—10TiO$_2$ composite layer, relative to a spectrum of wavelength from 350 nm to 850 nm over a two-month period of atmospheric exposure.
Figure 2:
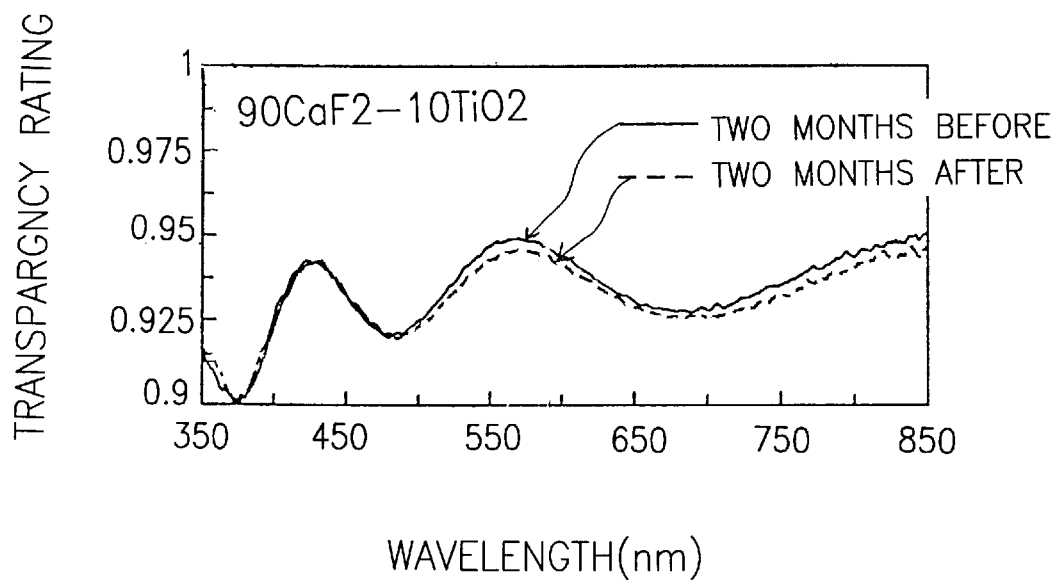
Figure 3:
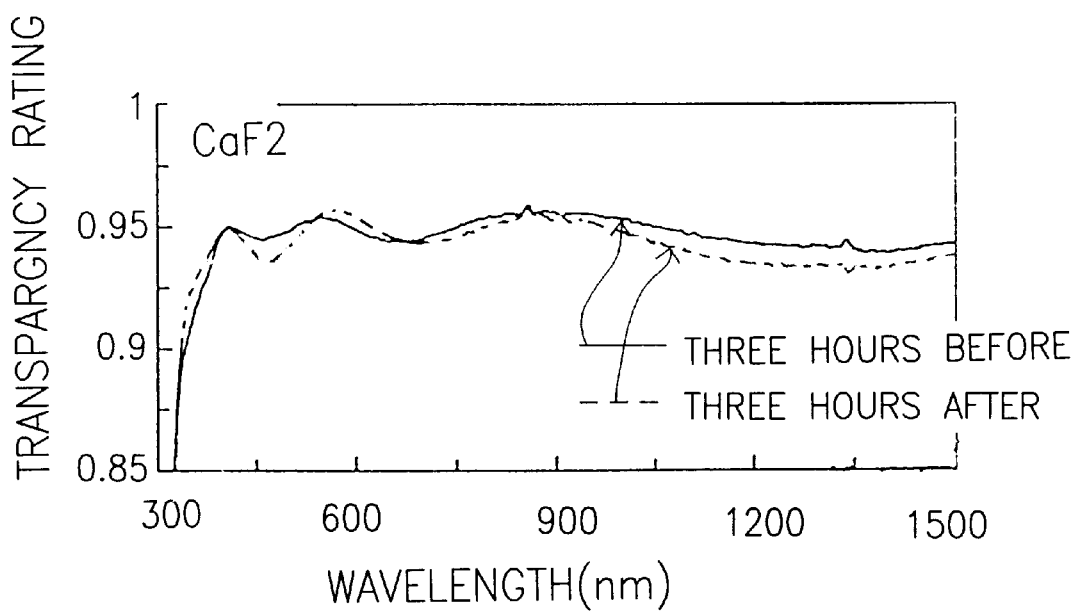
FIG. 3 includes two graphs, one showing the change in transmission of a pure $CaF_2$ layer-coated glass and another showing the change in transmission of a $90CaF_2$—$10TiO_2$ composite layer-coated glass, relative to a spectrum of wavelength from 350 nm to 1500 nm over a three-hour period in an atmosphere having a relative humidity of 95% and a temperature of 65° C.
Figure 3:
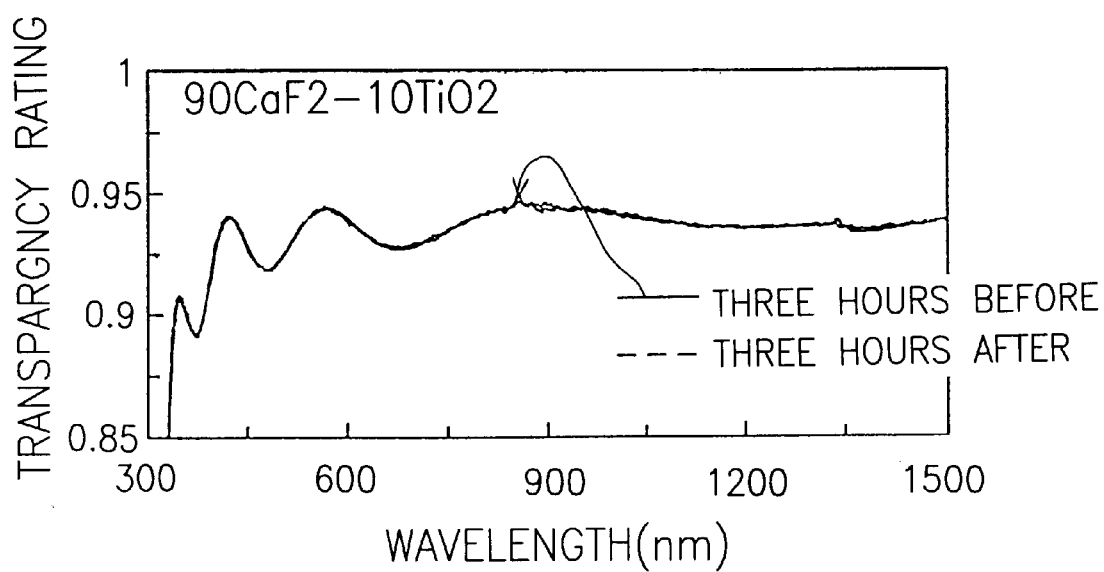

Besides having a better surface smoothness, hardness and adhesion strength than a pure $CaF_2$ film, the $(100-X)CaF_2$—$(X)TiO_2$ composite film 14 also has much better environmental stability than a pure $CaF_2$ film. FIG. 2 includes two graphs, one showing the change in transmission of a pure $CaF_2$ layer and another showing the change in transmission of a $90CaF_2$—$10TiO_2$ composite layer, relative to a spectrum of wavelength over a two-month period of atmospheric exposure. As shown in FIG. 2, the transmission spectrum of a $90CaF_2$—$10TiO_2$ composite layer shows only minor deviations after exposure to atmosphere for two months. In contrast, the variation of the transmission spectrum of a pure $CaF_2$ film layer is quite obvious. FIG. 3 includes two graphs, one showing the change in transmission of a pure $CaF_2$ layer and another showing the change in transmission of a $90CaF_2$—$10TiO_2$ composite layer, relative to a spectrum of wavelength over a three-hour period in an atmosphere having a relative humidity of 95% and a temperature of 65° C. As shown in FIG. 3, the transmission spectrum of a $90CaF_2$—$10TiO_2$ composite layer shows only minor deviations after exposure to atmosphere for three hours at a humidity of 95% and a temperature of 65° C. The deviation in the transmission spectrum is more obvious for a pure $CaF_2$ film layer. Since deviation of transmission spectrum reflects a variation in optical thickness, environmental stability of a $90CaF_2$—$10TiO_2$ composite layer is much better than a pure $CaF_2$ layer in withstanding heat and moisture.

Figure 4:
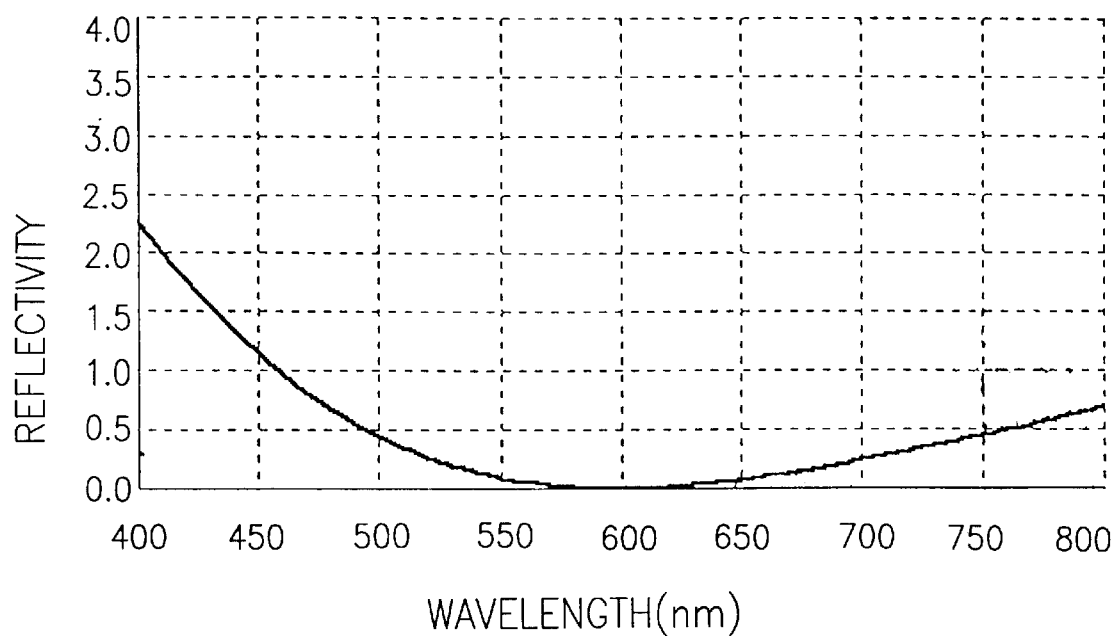
FIG. 4 is a graph showing the reflectivity of the $CaF_2$ and $TiO_2$ composite layer on the optical element shown in FIG. 1 for a spectrum of wavelength from 400 to 800 nm.

One of the main objects of this invention is to provide a water-resistant, hard, environmentally stable $(100-X)CaF_2$—$(X)TiO_2$ composite film over various types of organic and inorganic optoelectronic/optical coating element. If a layer of $(100-X)CaF_2$—$(X)TiO_2$ composite film 14 having a thickness of $\lambda/4$ is used as an anti-reflection layer over an optoelectronic/optical coating, the refractive index $n_1$ of the composite layer 14 must satisfy the following formula:

$$n_1 = \sqrt{n_0 \times n_s},$$

where $n_0$ is the refractive index of the incoming light medium, $n_s$ is the refractive index of the substrate 10 and $\lambda$ is the reference wavelength. When the reference wavelength $\lambda=600$ nm, the incoming light medium is air with a refractive index $n_0=1$, and the substrate 10 is glass having a refractive index $n_s=1.52$, the $(100-CaF_2$—$(X)TiO_2$ composite film 14 must have a refractive index $n_1=1.23$. A refractive index of 1.23 can be achieved by forming a composite layer with 2% molar concentration of $TiO_2$. In other words, the composite film 14 has a chemical composition $98CaF_2$—$2TiO_2$. FIG. 4 is a graph showing the reflectivity of the $CaF_2$ and $TiO_2$ composite layer on the optical element shown in FIG. 1 for a spectrum of wavelength. Similarly, when the substrate 10 is a silicon chip having a refractive index $n_s=3.6$, the composite film 14 has a refractive index $n_1=1.90$ when the incoming light has wavelength $\lambda=1600$ nm. The obtained optical coating as shown in FIG. 1 has a zero reflectivity at 1600 nm. A refractive index of 1.90 can be achieved by forming a composite layer with 45% molar concentration of $TiO_2$. In other words, the composite film has a chemical composition $55CaF_2$—$45TiO_2$.

Figure 5:
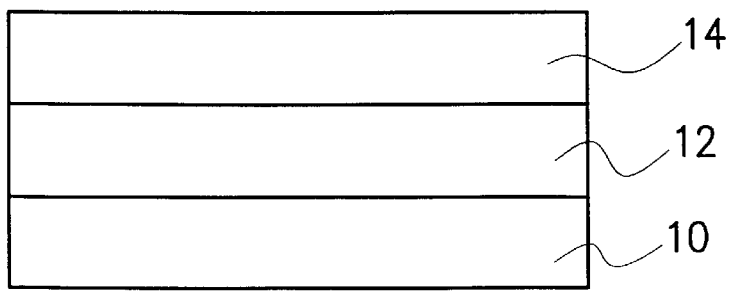
FIG. 5 is a sketch showing a water repellant optical element having more than one composite surface layer each composing of $CaF_2$ and $TiO_2$ according to a second embodiment of this invention.
Figure 6:
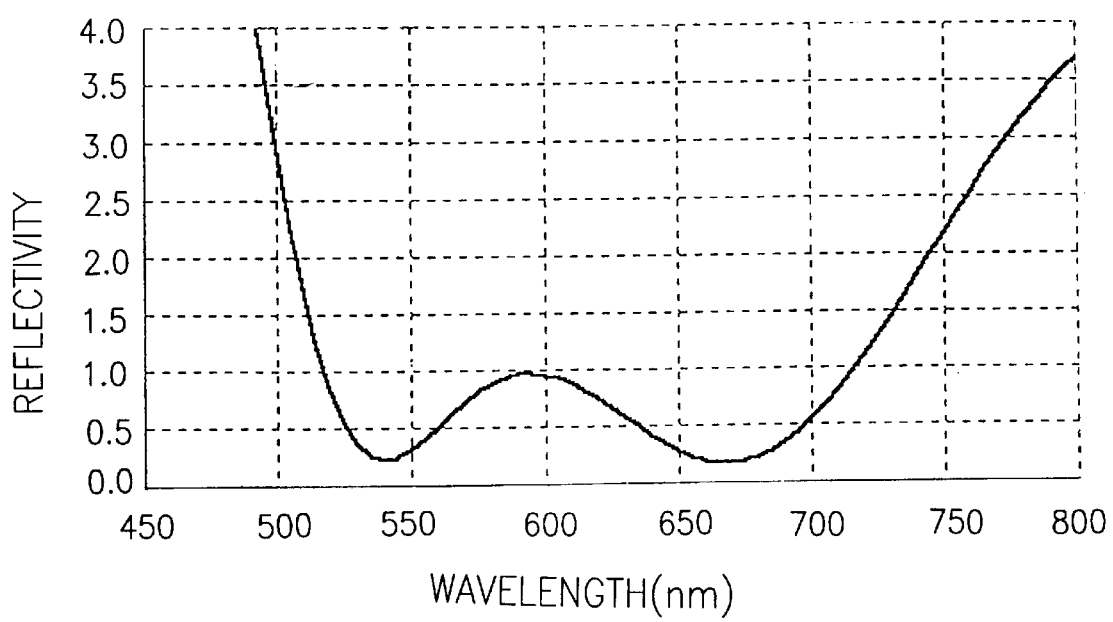
FIG. 6 is a graph showing the overall reflectivity of the $CaF_2$ and $TiO_2$ composite layers on the optical element shown in FIG. 5 for a spectrum of wavelength from 450 to 800 nm.

FIG. 5 is a sketch showing a water repellant optical element having more than one composite surface layers each composing of $CaF_2$ and $TiO_2$ according to a second embodiment of this invention. As shown in FIG. 5, an optical film such as a $(100-Y)CaF_2$—$(Y)TiO_2$ composite layer 12 is formed over a substrate 10, where Y is the molar percentage of $TiO_2$. A $(100-X)CaF_2$—$(X)TiO_2$ composite layer 14 is formed over the $(100-Y)CaF_2$—$(Y)TiO_2$ composite layer 12, where X is the molar percentage of the $TiO_2$ in the composite layer 14. Note that X≠Y because otherwise the composite layer 12 and the composite layer 14 are identical. If a $\lambda/4$-$\lambda/2$ double layer structure that includes the composite layer 14 and the composite layer 12 is formed over an optoelectronic/optical coating to serve as an ideal two-layered anti-reflection coating, the refractive index $n_2$ of the composite layer 12 must satisfy the following formula:

$$n_2^3 = \frac{n_2 n_s}{2 n_0 n_1} (n_0^2 + n_1^2)(n_1 + n_2) - n_1 n_s^2,$$

where $n_0$ is the refractive index of the incoming light, $n_s$ is the refractive index of the substrate 10, $n_1$ is the refractive index of the composite layer 14 and $\lambda$ is a reference wavelength. When the reference wavelength $\lambda=600$ nm, the incoming light medium is air with a refractive index $n_0=1$, and the substrate 10 is glass having a refractive index $n_s=1.52$, the $(100-X)CaF_2$—$(X)TiO_2$ composite film 14 has a refractive index $n_1=1.36$ when X=10%, then the composite layer 12 must have a refractive index $n_2=1.84$. This refractive index can be obtained by forming a composite layer with 45% molar concentration of $TiO_2$. In other words, the composite film 12 has a chemical composition $55CaF_2$—$45TiO_2$. FIG. 6 is a graph showing the overall reflectivity of the $CaF_2$ and $TiO_2$ composite layers on the optical element shown in FIG. 5 for a spectrum of wavelength 450 to 800 nm. Hence, without adding extra coating material and simply using low-temperature ion-assisted electron gun evaporation process, a water repellant and environmentally stable optoelectronic/optical element is formed. Since the evaporation process is a low-temperature process, this method can be applied to form single or multilayer coatings on temperature sensitive organic or inorganic substrate or optoelectronic/optical element. Furthermore, through proper optical design, the composite layer can serve as anti-reflection film or an optical film with special properties for an optoelectronic/optical element.

Conventional method uses a pure $CaF_2$ film to serve as a low refractive index coating for an optical element. However, pure $CaF_2$ film is very soft ($231N/mm^2$) and has a rough surface (14.4 nm). Moreover, its adhesion strength with a glass substrate is poor ($19.1N/mm_2$). Consequently, pure $CaF_2$ film has short lifetime problems. The $(100-X)CaF_2$—$(X)TiO_2$ composite layer of this invention is formed using a low-temperature ion-assisted electron gun evaporation process. Through the addition of TiO2 material into CaF2 material, properties of the composite layer such as surface smoothness, adhesion strength and hardness are all improved without compromising water repellant capacity. The (100-X)$CaF_2$—(X)$TiO_2$ composite layer has superior water repellant capacity. For a composite layer having a percentage composition of $TiO_2$ between 2% to 100%, contact angle of water droplets is always greater than 100° comparable with Teflon. The refractive index varies according to the composition, but in general, the refractive index falls between 1.23 (2%$TiO_2$) to 2.3 (pure $TiO_2$) for incoming light with a wavelength of 600 nm. Aside from having a good water repellant capacity, the composite layer can also be used as an anti-reflection layer or a layer with special optical properties in an optoelectronic/optical element.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical element having a water repellant composite layer composed of $CaF_2$ and $TiO_2$, comprising:
    a substrate; and
    a composite layer having a chemical formula (100-X)$CaF_2$—(X)$TiO_2$ formed over the substrate, wherein X in the formula represents the molar percentage of $TiO_2$.

2. The optical element of claim 1, wherein material constituting the substrate is glass.

3. The optical element of claim 2, wherein the glass substrate has a refractive index 1.52.

4. The optical element of claim 3, wherein the molar percentage of $TiO_2$ in the (100-X)$CaF_2$—(X)$TiO_2$ composite layer is 2%.

5. The optical element of claim 4, wherein the refractive index of the (100-X)$CaF_2$—(X)$TiO_2$ composite layer is 1.23.

6. The optical element of claim 5, wherein the (100-X)$CaF_2$—(X)$TiO_2$ composite layer has an optical thickness of $\lambda/4$.

7. An optical element having a water repellant composite layer composed of $CaF_2$ and $TiO_2$, comprising:
    a substrate;
    at least one optical film formed over the substrate; and
    a composite layer having a chemical formula (100-X)$CaF_2$—(X)$TiO_2$ formed over the optical film, wherein X in the formula represents the molar percentage of $TiO_2$.

8. The optical element of claim 7, wherein material constituting the substrate is glass.

9. The optical element of claim 8, wherein the glass substrate has a refractive index 1.52.

10. The optical element of claim 7, wherein the optical film is a composite layer having a chemical formula (100-Y)$CaF_2$—(Y)$TiO_2$ where Y is the molar percentage of $TiO_2$ in the composite layer.

11. The optical element of claim 10, wherein the molar percentage of $TiO_2$ in the (100-Y)$CaF_2$—(Y)$TiO_2$ composite layer is about 45%.

12. The optical element of claim 11, wherein the refractive index of the (100-Y)$CaF_2$—(Y)$TiO_2$ composite layer is 1.84.

13. The optical element of claim 12, wherein the (100-Y)$CaF_2$—(Y)$TiO_2$ composite layer has an optical thickness of $\lambda/2$.

14. The optical element of claim 7, wherein the mole percentage of $TiO_2$ in the (100-X)$CaF_2$—(X)$TiO_2$ composite layer is 10%.

15. The optical element of claim 14, wherein the refractive index of the (100-X)$CaF_2$—(X)$TiO_2$ composite layer is 1.36.

16. The optical element of claim 15, wherein the (100-X)$CaF_2$—(X)$TiO_2$ composite layer has an optical thickness of $\lambda/4$.

* * * * *